United States Patent [19]

Bedogni

[11] 4,387,554
[45] Jun. 14, 1983

[54] CUTTER BAR

[76] Inventor: Erminio Bedogni, Via Mascagni 36, Reggio Emilia, Italy, 42100

[21] Appl. No.: 313,826

[22] Filed: Oct. 22, 1981

[30] Foreign Application Priority Data

Dec. 5, 1980 [IT] Italy ............................. 29065/80[U]

[51] Int. Cl.³ ........................................... A01D 55/02
[52] U.S. Cl. ........................................ 56/296; 56/298
[58] Field of Search ................................. 56/296–313, 56/14.5, 14.6, 257, 264

[56] References Cited

U.S. PATENT DOCUMENTS

| 497,320 | 5/1893 | Hillabold | 56/301 |
| 2,560,222 | 7/1951 | Hansen | 56/309 |
| 2,664,690 | 1/1954 | Huddle et al. | 56/297 |
| 2,761,269 | 9/1956 | Krause et al. | 56/298 |
| 3,151,434 | 10/1964 | Hamel | 56/296 |
| 3,430,421 | 3/1969 | Matthews | 56/298 |

FOREIGN PATENT DOCUMENTS

| 165734 | 12/1933 | Fed. Rep. of Germany | 56/298 |
| 1375212 | 9/1964 | France | 56/298 |
| 2361049 | 10/1978 | France | 56/298 |
| 490785 | 7/1970 | Switzerland | 56/298 |
| 496388 | 11/1970 | Switzerland | 56/298 |

Primary Examiner—Jay N. Eskovitz
Attorney, Agent, or Firm—Brumbaugh, Graves, Donohue & Raymond

[57] ABSTRACT

The invention relates to an improved cutter bar. The bar consists basically of a stationary comb (1) upon whose teeth a toothed blade (2) slides back and forth in alternating motion while being maintained in contact with the comb by means of blade-retaining brackets (3); the blade and the comb furnished with respective recesses (2b and 1b), the latter longitudinally disposed; the recesses being opposed in such a way as to establish an enclosed channel into which a rod (5) may be inserted with the capability of sliding therein. The blade teeth protrude transversely with respect to the bar, and forward therefrom with respect to the teeth of the comb.

5 Claims, 4 Drawing Figures

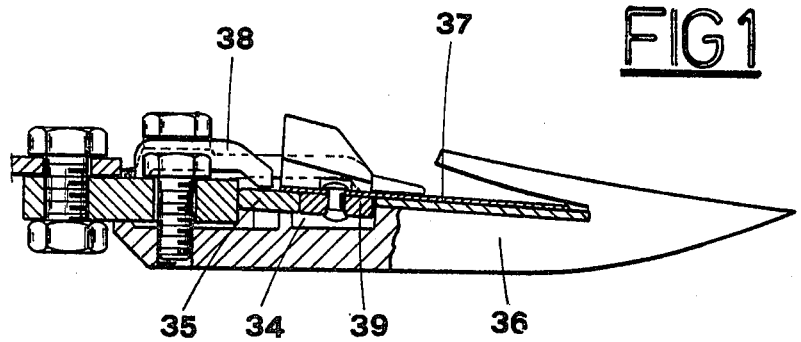
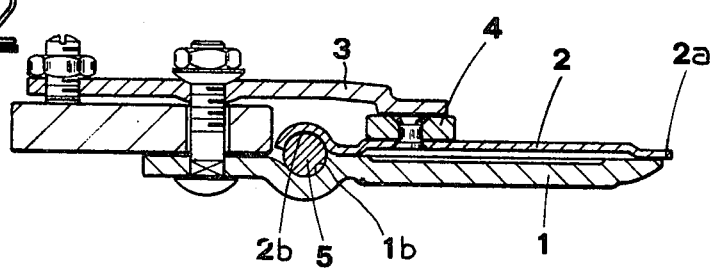
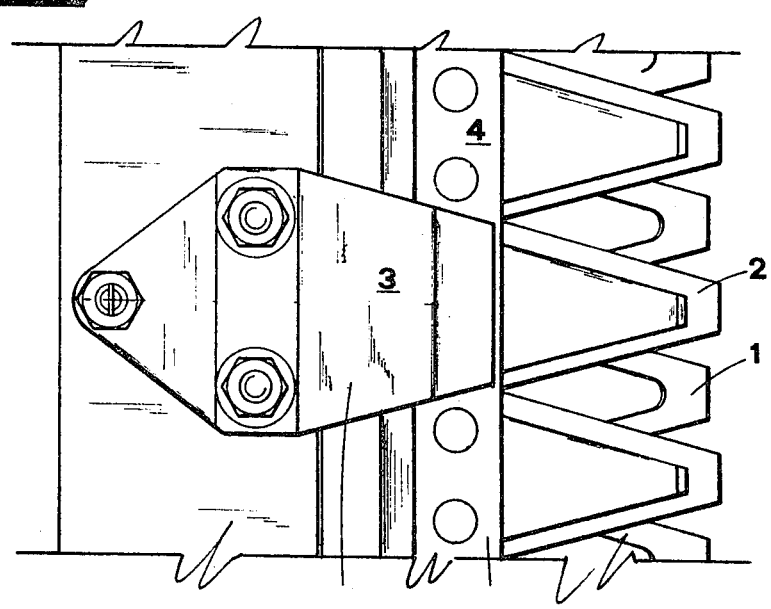

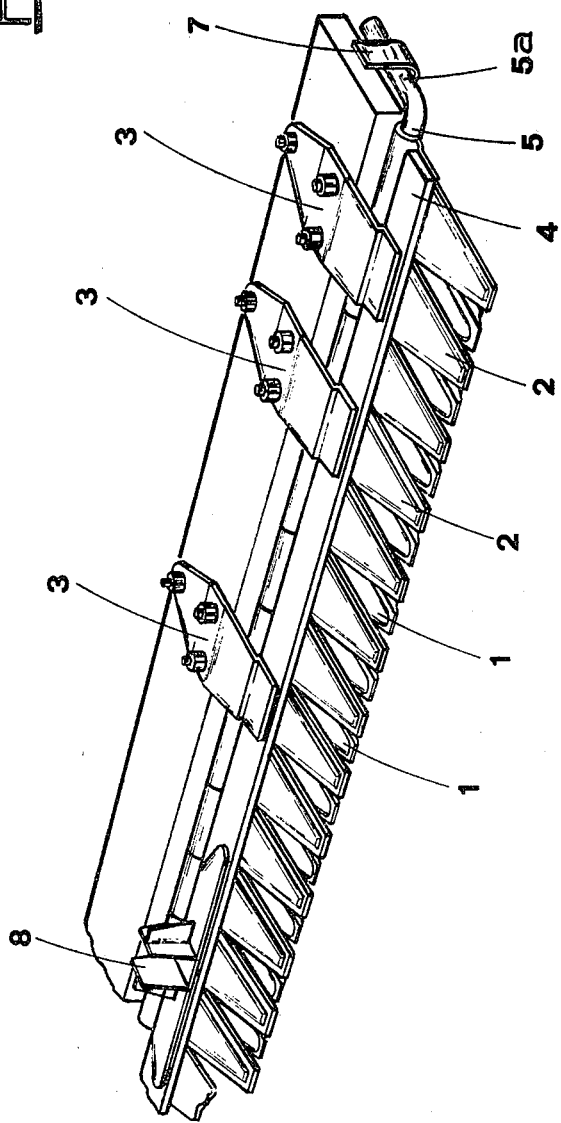

CUTTER BAR

BACKGROUND OF THE INVENTION

The invention described herein is an improved cutter bar. Conventional cutter bars, which are normally attached to any one of a variety of drive mechanisms such as motor mowers, tractors, motorised farming machinery and cultivators etc., find their usefulness in the gathering of grass or other kinds of forage from field or meadow. Such bars normally consist of a lower, stationary comb upon whose teeth a blade passes in alternating motion, the two components maintained in contact by means of blade-retaining brackets; the sliding action of the sides of the blade teeth across the sides of the comb teeth furnishes the actual cut of forage which becomes inserted between the two said components.

Conventional cutter bars currently in use show blade teeth fastened to a longitudinally disposed (bored out) rod which slides within a channel located in the comb body; the need arises for dismantling the blade—for whatever reason, e.g. sharpening—and the blade itself must be slid longitudinally with respect to the direction of forward movement of the machine to which the cutter bar is attached.

Since the upper side of the blade is provided with a forked device, or yoke, designed to accommodate the driven shaft-end whose oscillating motion is imparted to the blade itself, withdrawal of the blade necessitates removal of the blade-retaining brackets, as the latter constitute an obstruction to the above-mentioned yoke—hence an impediment in the way of satisfactory withdrawal of the blade. Dismantling and reassembly of the blade requires a considerable amount of time as a result of the above-described inconvenience.

SUMMARY OF THE INVENTION

One object of the invention described herein is to dispense with the above-described inconvenience by providing a cutter bar whose blade may be dismantled and reassembled with marked swiftness and ease.

A further object of the invention is that of providing a cutter bar wherein the likelihood of cut forage or grass becoming clogged along the mowing line is rendered null.

Yet another object of the invention is to create a cutter bar of extremely simplified construction and which will guarantee long working life of all parts subject to wear through friction.

These and other objects are all attained by the cutter bar described herein, being of the type which comprises a stationary comb upon whose teeth a toothed blade passes back and forth in alternating motion, the latter held in contact with the former by means of blade-retaining brackets, characterised by the fact that the said blade and the said comb are each furnished with a longitudinally disposed recess, the said recesses opposed so as to establish an enclosed channel into which a rod of corresponding size may be inserted with the possibility of sliding therein; both said comb and said blade of shape such as will allow the blade, —the said rod having been removed—to slide freely in a transverse direction with respect to the comb.

BRIEF DESCRIPTION OF THE DRAWINGS

Further features and advantages of the invention described herein will emerge more clearly from the detailed description which follows of a preferred, whilst not exclusive form of embodiment of a cutter bar to which the invention relates, illustrated as a strictly unlimited example with the aid of the accompanying drawings, in which:

FIG. 1 shows a cross-section of the vertical elevation of a conventional cutter bar currently in use;

FIG. 2 shows a cross-section of the vertical elevation of the cutter bar described herein;

FIG. 3 shows the view from above of one part of the cutter bar described herein;

FIG. 4 shows a part of the cutter bar described herein, in perspective.

FIG. 1 shows the cross-section of a cutter bar of the kind currently in use, which comprises a comb 36 upon which a blade 37 slides back and forth; the blade is kept in contact with the comb by means of blade-retaining brackets 38. The blade, —an assembly of separately-fashioned teeth—comprises a connection plate 39 to which individual teeth making up the blade are anchored; a guide batten 35, or wear batten, is disposed rearwardly of the plate 39.

The plate 39 slides perpendicularly as it were with respect to the drawing, accommodated within a recess 34 and guided thus in sliding both by batten 35 and by the recess walls 34.

In order to dismantle the blade from a cutter bar of this type it becomes necessary to slide the blade out longitudinally with respect to the comb—that is, perpendicularly with respect to the drawing on the page—in order to withdraw same; to achieve this the blade-retaining brackets must be dismantled as these last constitute an obstruction in themselves, —as outlined previously—, disallowing the blade's continued slide by dint of their striking against the yoke which transmits oscillatory drive to the blade, (this being the type of arrangement illustrated in FIG. 4), in the course of the yoke's would-be sliding exit. This is the case with bars having centrally-imparted motion.

DESCRIPTION OF THE PREFERRED EMBODIMENT

The cutter bar to which the invention refers, as illustrated in FIGS. 2, 3 and 4 likewise comprises a stationary comb 1 upon which a toothed blade 2 slides back and forth in alternating motion while being held in contact with the comb by means of blade-retaining brackets 3. The blade 2 and comb 1 are each furnished with a recess 2b and 1b respectively, these disposed longitudinally; the recesses 2b and 1b are opposed so as to establish an enclosed channel into which a rod 5 of corresponding size may be inserted with the possibility of sliding therein. The recesses 2b and 1b are semi-circular in cross-section whilst the rod 5 cross-section is circular.

The rod 5 is provided with a protruding extremity 5a, this being bent through so as to engage a movement-prohibiting element, or catch 7 integrated into the comb, upon rotation of the rod itself.

The blade is made up of a number of teeth—with cross-section as per a blade—fashioned as individual parts; a connecting plate 4, longitudinally disposed, provides for solid anchorage of individual teeth making up the composite blade 2. Fixture of the blade teeth to the connecting plate may be carried out by riveting.

The plate 4 is disposed uppermost of the blade 2; the blade-retaining brackets 3 maintain the blade in contact with the comb by bearing down on the topmost surface of the plate 4, the latter being disposed at a height greater than that of the outer surface of the blade recess 2b.

Dismantling of the blade from the cutter bar is achieved by turning the extremity 5a of rod 5 to the point where it becomes disengaged fom catch 7, whereupon rod 5 may be withdrawn from the channel formed by recesses 2b and 1b. At this juncture the particular shape given to the blade allows its withdrawal by sliding transversely with respect to the comb—that is, by sliding in the direction corresponding to that of the cutter bar's forward movement. In fact, the height of that uppermost surface establishing blade recess 2b is lower than that defined by positioning of blade-retaining brackets 3, thus the said surface may pass freely below the brackets; moreover, no other element is present in the cutter bar which might hinder withdrawal of the blade therefrom in the said transverse direction.

The sliding action of the blade 2 upon the rod 5, which performs the function both of guide element and wear batten, provokes wear on the rod 5 itself; nevertheless, the cutter bar's special construction design permits right functioning even given somewhat considerable wear on the rod 5, as it suffices to increase the pressure exerted on the blade-retaining brackets for procurement of the desired degree of adhesion between blade 2 and comb 1.

The blade 2 protrudes transversely and forwardly with respect to the comb 1; the actual jutting edge 2a of the blade—with respect to the comb—serves to preclude the possibility of clogging along the length of the cutter bar's forward mowing line. Conventional bars currently in use are invariably subject to this problem, as the rearward disposition of the blade with respect to the comb gives rise to the possibility of the cutter bar's forward section accumulating forage and other foreign bodies, thus impeding the forage intended for mowing from entering in between blade and comb, hence foiling its being cut.

By virtue of its presenting a jutting edge 2a which forms a part of, and moves in alternation with the blade 2 itself, the cutter bar herein described is enabled to maintain its mowing line continuously free from accumulations, thus permitting the forage for mowing to be introduced with ease between the teeth of blade and comb during the cutter bar's forward movement, and therefore to be cut in the requisite manner.

Numerous modifications of a practical nature may be applied to the constructional details of the invention, —for instance the shape of blade or comb may vary, or the cross-section of the rod be different, as indeed could the manner of restraining the rod's protruding extremity—without straying from within the bounds of protection affroded to the concept, as claimed below.

What is claimed is:

1. In an improved cutter bar arrangement comprising
   (a) a stationary comb including a plurality of teeth;
   (b) a toothed blade adapted to slide back and forth in an alternating motion upon the teeth of said stationary comb; and a
   (c) blade-retaining means for maintaining contact between said stationary comb and said toothed blade, the improvement wherein:
   said stationary comb and said blade are provided with respective longitudinally disposed recesses so opposed as to establish an enclosed channel, and wherein said arrangement further comprises a rod of a size corresponding to said enclosed channel and slidably received therein, said stationary comb and said blade being so shaped that, when said rod is removed from said channel, said blade slides freely off of said stationary comb in a direction transverse to said comb.

2. Cutter bar according to claim 1 characterised by the fact that it comprises a longitudinally disposed connecting plate (4) to which the teeth of said blade are anchored, and whose uppermost surface, being of a height greater than that of the outer surface produced by the recess in said blade, abuts with said blade-retaining means.

3. Cutter bar according to claim 1 characterised by the fact that each of said recesses is semi-circular in cross-section and said rod cross-section is circular.

4. Cutter bar according to claim 3 characterised by the fact that said rod (5) is provided with a bent protruding extremity (5a); there being provision for a catch element (7) integrated into said comb, into which said bent rod extremity may be inserted by rotation of said rod.

5. Cutter bar according to claim 1 characterised by the fact that the said blade protrudes transversely and forwardly with respect to the said comb.

* * * * *